United States Patent
Nothem et al.

(10) Patent No.: US 6,186,580 B1
(45) Date of Patent: Feb. 13, 2001

(54) SUPPORT STRUCTURE FOR A CANOPY OF A TRAILER

(75) Inventors: Jeffrey M. Nothem, Mayville; Tony P. Priesgen, Hartford, both of WI (US)

(73) Assignee: Triton Corporation, Hartford, WI (US)

( * ) Notice: Under 35 U.S.C. 154(b), the term of this patent shall be extended for 0 days.

(21) Appl. No.: 09/362,938

(22) Filed: Jul. 28, 1999

(51) Int. Cl.$^7$ ...................................................... B60J 7/00
(52) U.S. Cl. ................... 296/181; 296/173; 296/100.08; 296/100.02; 296/100.1
(58) Field of Search ................... 296/100.02, 100.06, 296/100.08, 100.01, 173; 16/280, 282; 403/297, 298, 54, 52, 31, 111

(56) References Cited

U.S. PATENT DOCUMENTS

| | | | |
|---|---|---|---|
| 2,531,140 | * 11/1950 | Linde | 296/100.08 |
| 2,843,418 | * 7/1958 | Gray | 296/173 |
| 3,403,936 | * 10/1968 | Young | 296/173 |
| 3,514,150 | * 5/1970 | Wallace | 296/173 |
| 3,700,124 | * 10/1972 | Lawrance | 296/61 |
| 3,721,467 | * 3/1973 | Kerr | 296/100.02 |
| 3,765,716 | * 10/1973 | Van Gompel | 296/100.08 |
| 3,768,855 | * 10/1973 | Laue | 296/173 |
| 4,101,162 | * 7/1978 | Koehn | 296/100.1 |
| 5,104,175 | * 4/1992 | Enninga | 296/100.1 |
| 5,366,266 | * 11/1994 | Harbison | 296/100.02 |
| 5,505,515 | * 4/1996 | Turner | 296/173 |
| 5,681,074 | 10/1997 | Christensen | 296/181 |
| 5,909,921 | * 6/1999 | Nesbeth | 296/100.06 |
| 5,988,728 | * 11/1999 | Lund et al. | 296/100.08 |

* cited by examiner

Primary Examiner—Joseph D. Pape
Assistant Examiner—Kiran Patel
(74) Attorney, Agent, or Firm—Janson, Shupe, Bridge & Munger, Ltd.

(57) ABSTRACT

A support structure is provided for supporting a canopy on a trailer. The support structure includes a first support arm having a first end pivotably connected to the canopy and a second pivotably connected to the first end of an intermediate support arm. The second end of the intermediate support arm is pivotably connected to the first end of a third support arm. The second end of the third support arm is pivotably connected to the trailer. First and second pneumatic springs are also provided. First pneumatic spring interconnects the first support arm and intermediate arm and the second pneumatic spring interconnects the intermediate support arm and the third support arm. The pneumatic springs assist an operator in lifting the canopy and provides sufficient force to maintain the canopy in an open position.

20 Claims, 5 Drawing Sheets

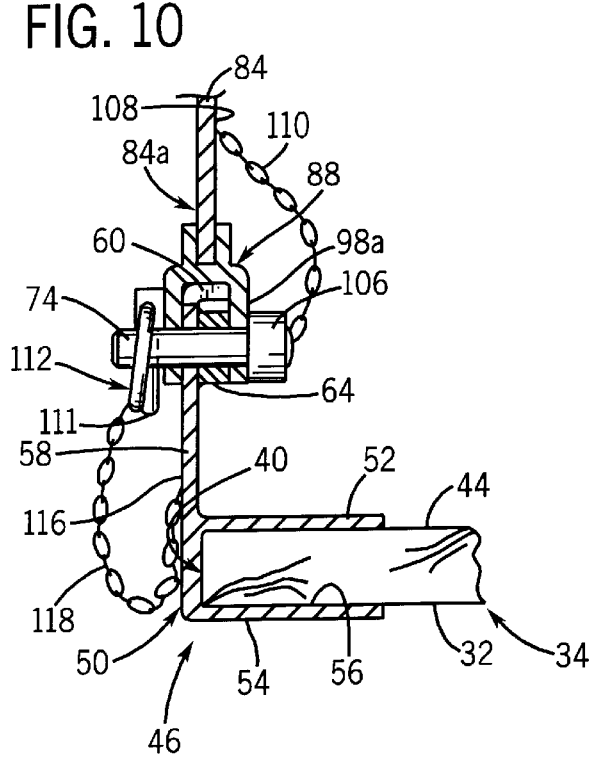
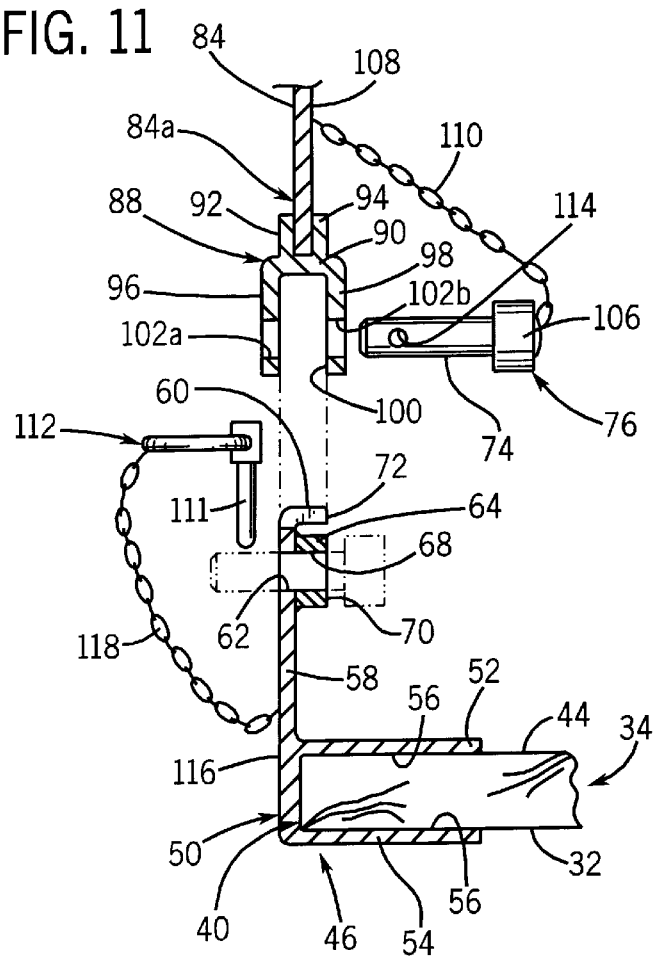
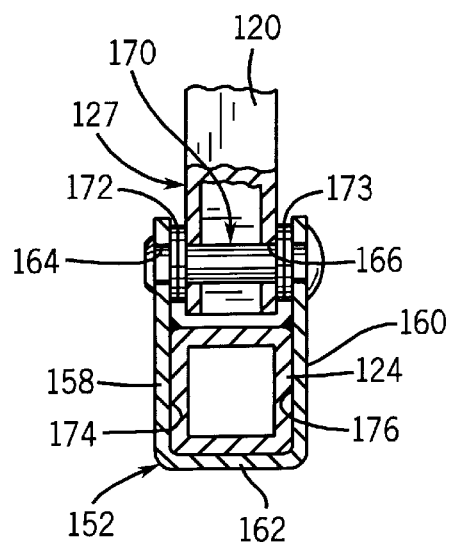
FIG. 10
FIG. 11
FIG. 12

SUPPORT STRUCTURE FOR A CANOPY OF A TRAILER

FIELD OF THE INVENTION

This invention relates to trailer, and in particular, to a support structure for supporting a canopy on a trailer.

BACKGROUND OF THE INVENTION

As is known, it is conventional to interconnect a trailer to a tow vehicle in order to transport various loads over a distance. By way of example, such loads may include snowmobiles, all-terrain vehicles, and the like. In order to protect a load during transport, a trailer cover or canopy may be positioned on the trailer over the load.

A trailer canopy is relatively heavy in order to maintain the canopy on the trailer during the transport thereof. However, it is often desirable to gain access to the load within the canopy at intermittent time periods during transport of the trailer. Due to the weight associated with the canopy, it may be difficult to gain access to the load captured therein. Typically, the canopy must either be completely removed from the trailer, or alternatively, pivoted on one end of the trailer so as to allow access from the opposite end. While such an arrangement allows access to the portion of the load at one end of the trailer, it may be difficult or impossible to access the opposite end of the load since that portion of the load may still be partially or completely covered by the canopy.

In order to overcome such limitations in the art, mounting arrangements have been developed which allowed for the canopy to be tilted on the trailer toward the front and also toward the rear of the trailer thereby allowing access to the load at either the rear and the front of the trailer, respectively. By way of example, Christensen, U.S. Pat. No. 5,681,074 discloses a trailer cover arm for assisting in the opening of a trailer cover or canopy and supporting the canopy in an open position. The arm assembly disclosed in the Christensen '074 patent includes four elongated members interconnected to form a parallelogram shape. First and second elongated gas springs are placed within the parallelogram member to assist an operator in the opening and supporting of the canopy in the open position. While functional for its intended purpose, such an arm assembly requires numerous parts and may be time consuming to assemble. Consequently, it is highly desirable to provide a support structure for a canopy of a trailer which allows for "two-way" pivoting of the canopy on the trailer and which is less expensive to manufacture.

Therefore, it is a primary object and feature of the present invention to provide a support structure for a canopy of a trailer which is constructed from fewer components than prior support structures.

It is a further object and feature of the present invention to provide a support structure for a canopy of a trailer which allows the canopy to be tilted toward the front and also toward the rear of the trailer.

It is a still further object and feature of the present invention to provide a canopy for a trailer which is simple and inexpensive to manufacture.

SUMMARY OF THE INVENTION

In accordance with the present invention, a support structure is provided for supporting a canopy on a trailer. The supports structure includes a first support arm having a first and second opposite ends. The first end is pivotably connected to the canopy. A first end of an intermediate support arm is pivotably connected to a second end of the first support arm. The first end of a third support arm is pivotably connected to the second end of the intermediate support arm and the second end of the third support arm is pivotably connected to the trailer.

It is contemplated that a pneumatic spring interconnect the first support arm and the intermediate support arm. The pneumatic spring urges the first end of the first support arm away from the intermediate support arm. A second pneumatic spring interconnects the third support arm and the intermediate support arm. The second pneumatic spring urges the first end of the intermediate support arm away from the second end of the third support arm.

In accordance with a still further aspect of the present invention, a support assembly is provided for supporting a canopy on a trailer. The support assembly includes first and second support structures. Each support structure includes a first support arm having first and second opposite ends. The first end is pivotably connected to the canopy. An intermediate support arm has a first end pivotably connected to the second end of the first support arm. The second end of the intermediate support arm is pivotably connected to the first end of a third support arm. The second end of the third support arm is pivotably connected to the trailer.

Each support structure may include a pneumatic spring. The pneumatic spring of each support structure interconnects the first support arm and intermediate support arm thereof. Each pneumatic spring has a first end pivotably connected to a corresponding first support arm and a second end pivotably connected to the intermediate support arm. Each support structure may also include a second pneumatic spring. The second pneumatic spring of each support structure interconnects the intermediate support arm and the third support arm thereof. Each pneumatic spring has a first end pivotably connected to a corresponding intermediate support arm and the second end pivotably connected to a corresponding third support arm.

In accordance with a still further aspect of the present invention, a trailer is provided for transporting a load. The trailer includes a frame structure extending along a longitudinal axis. The frame structure is supported above the supporting surface by a wheel and axle assembly. A bed is mounted on the frame structure. The bed has forward and rearward ends and is defined by first and second sides. A canopy is positioned on the bed. The canopy also has forward and rearward ends. A support structure interconnects the canopy on the bed. The support structure includes a first support arm having first and second opposite ends. The first end is pivotably connected to the canopy. An intermediate support arm is also provided. The first end of the intermediate support arm is pivotably connected to the second end of the first support arm and the second end of the intermediate support arm is pivotably connected to the first end of a third support arm. The second end of the third support arm is pivotably connected to the trailer.

It is contemplated to provide a first releasable hinge for releasably interconnecting the forward end of the canopy to the forward end of the bed and a second releasable hinge to releasably interconnecting the rearward end of the canopy to the rearward end of the bed.

It is contemplated that the canopy include first and second opposite sides. Each side of the canopy terminates at an elongated generally U-shaped bracket. First and second side rails extend along opposite sides of the bed. Each side rail is receivable within a corresponding U-shaped bracket.

It is still further contemplated that the support structure include a first pneumatic spring having a first end pivotably connected to the first support arm and a second end pivotably connected to the intermediate support arm. A second pneumatic spring is also provided. The second pneumatic spring has the first end pivotably connected to the intermediate support arm and the second end pivotably connected to the third support arm.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 10 is a cross-sectional view taken along line 10—10 of FIG. 3b showing the front end of the canopy pivotably connected to the front end of the trailer;

FIG. 11 is a cross-sectional view, similar to FIG. 10, showing the front end of the canopy disconnected from the front end of the trailer; and FIG. 12 is a cross-section view taken along line 12—12 of FIG. 4.

DETAILED DESCRIPTION OF THE PREFERRED EMBODIMENT

Figure 1:
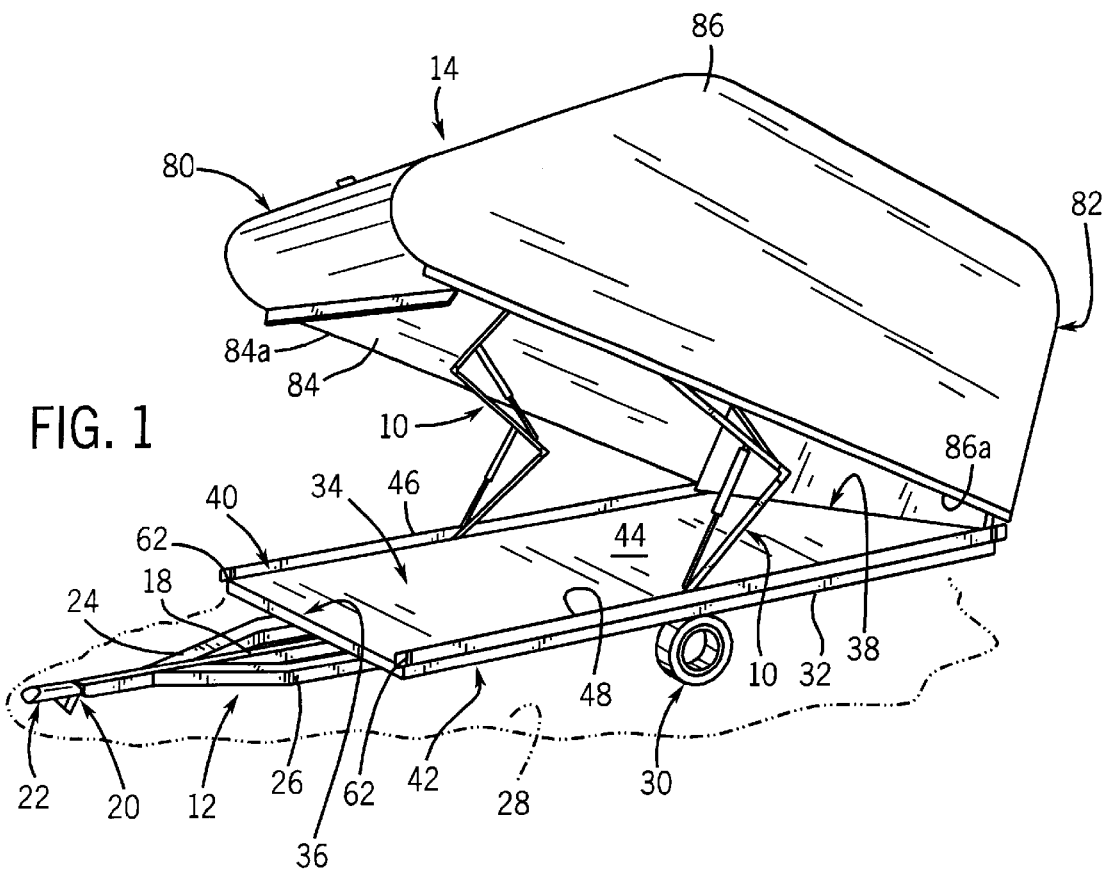
FIG. 1 is an isometric view of a trailer having a canopy interconnected thereto by a support structure in accordance with the present invention wherein the front portion of the canopy is in an open position.
Figure 2:
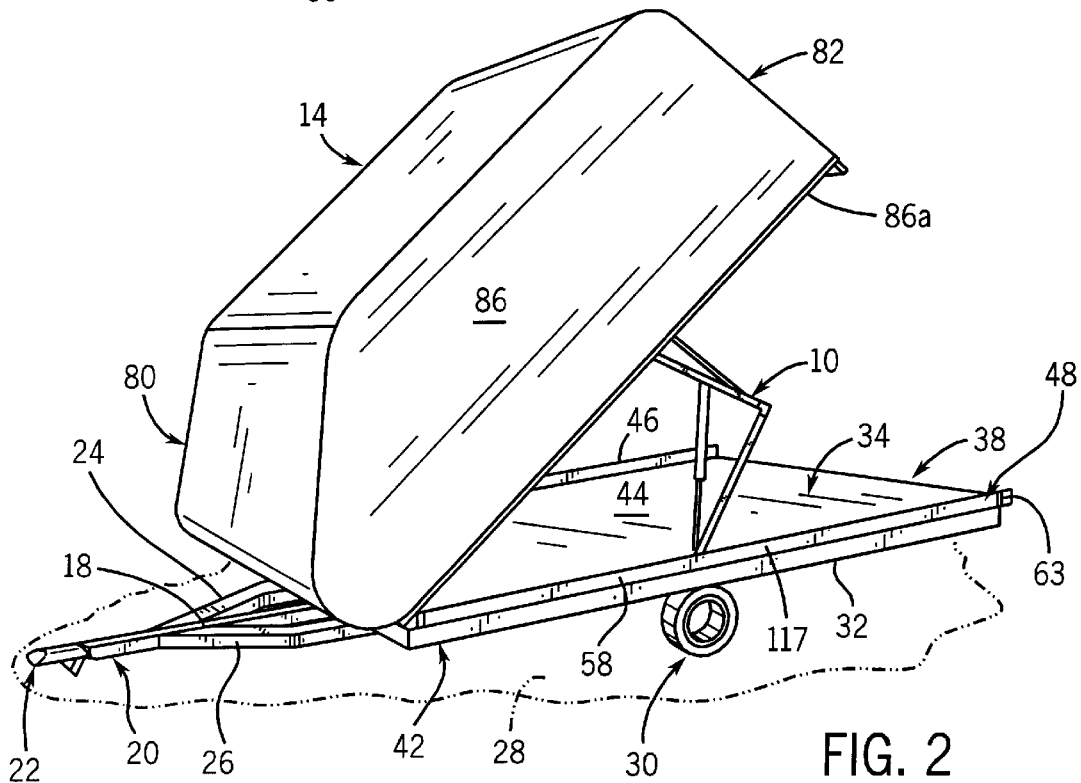
FIG. 2 is an isometric view of the trailer having the canopy interconnected thereto by the support structure of the present invention wherein the rear portion of the canopy is an open position.

Referring to FIGS. 1 and 2, a support structure in accordance with the present invention is generally designated by the reference numeral 10. Support structure 10 is intended to facilitate the opening of canopy 14 on trailer 12, as hereinafter described.

Trailer 12 includes a frame structure 16 which extends along a longitudinal axis. Frame structure 16 includes an elongated central frame member 18 having a first forward end 20 which includes a cup-shaped receiver 22 mounted thereon for receiving a conventional ball attached to the rear of a towing vehicle (not pictured). Frame structure 16 further includes first and second side frame members 24 and 26, respectively, which are joined to and extend from opposite sides of central frame member 18. It is contemplated to support frame structure 16 above a supporting surface 28 by a conventional wheel and axle assembly, generally designated by the reference numeral 30.

The bottom surface 32 of a generally flat bed 34 is interconnected to and supported on central frame member 18 and side frame members 24 and 26 of flame structure 16. Bed 34 is defined by forward and rearward ends 36 and 38, respectively, and sides 40 and 42. As best seen in FIGS. 1 and 2, bed 34 includes a generally flat, upwardly facing surface 44 for supporting the load intended to be towed by the towing vehicle. Trailer 12 further includes first and second side rails 46 and 48, respectively, which are interconnected to and which project vertically from corresponding sides 40 and 42, respectively of bed 34. Side rails 46 and 48 are identical in construction, and as such, the description hereinafter of side rail 46 and the mounting of side rail 46 to side 40 of bed 34 is understood to describe the construction of side rail 48 and the mounting of side rail 48 to side 42 of bed 34, as if fully described herein.

Referring to FIGS. 10 and 11, side rail 46 includes a generally C-shaped lower portion 50 having an inwardly directed upper flange 52 and an inwardly directed lower flange 54. Upper and lower flanges 52 and 54, respectively, define a bed side receiving cavity 56 therebetween for receiving corresponding side 40 of bed 34 therein.

Side rail 46 further includes a sidewall 58 extending vertically from lower portion 50. Sidewall 58 terminates at an inwardly directed upper edge 60. Forward and rearward apertures 62 and 63, respectively, extend through sidewall 58 of side rail 46 at locations adjacent the forward and rearward ends 36 and 38, respectively, of bed 34. Spacer elements 64 are affixed to the inner surface 66 of sidewall 58 by welding or the like. Spacer elements 64 includes passageways 68 therethrough which are in axial alignment with corresponding apertures 62 and 63 in sidewall 58. Each spacer element 64 terminates at an inwardly directed face 70 which is co-planar with the terminal face 72 of upper edge 60 of sidewall 58. Passageways 68 in spacer elements 64 and their corresponding apertures 62 and 63 in sidewall 58 of side rail 46 define pin receipt passageways for receiving the shaft 74 of a pin 76, for reasons hereinafter described.

As best seen in FIGS. 1–2, canopy 14 includes forward end 80, rearward end 82, and sides 84 and 86 extending therebetween. Sides 84 and 86 are spaced along an axis transverse to the longitudinal axis of trailer 12 so as to be generally co-planar with sidewalls 58 of corresponding side rails 46 and 48, respectively, of trailer 12. Referring back to FIGS. 10 and 11, sides 84 and 86 of canopy 14 terminate at corresponding lower ends 84a and 86a, respectively. Each lower end 84a and 86a extends into and is interconnected to a corresponding generally U-shaped bracket 88. U-shaped brackets 88 extend along the entire length of corresponding lower ends 84a and 86b of sides 84 and 86, respectively, of canopy 14.

Each U-shaped bracket 88 includes a generally flat elongated base 90 having first and second support flanges 92 and 94 extending upwardly therefrom. Support flanges 92 and 94 define a lower end receiving cavity 95 for receiving corresponding lower ends 84a and 86a of sides 84 and 86, respectively, therein. Each U-shaped bracket 88 further includes first and second sidewalls 96 and 98 depending from opposite sides of base 90. Sidewalls 96 and 98 of U-shaped brackets 88 define side rail receiving channels 100 dimensioned for receiving upper edges 60 of corresponding sidewalls 58 of side rails 46 and 48, respectively, therein. Sidewalls 96 and 98 of each U-shaped bracket 88 include forward apertures 102a and 102b, respectively, and rearward apertures (not shown). Forward apertures 102a and 102b in sidewalls 96 and 98, respectively, of each U-shaped bracket 88 are in axial alignment with each other. Similarly, rearward apertures (not shown) in sidewalls 96 and 98, respectively, of each U-shaped bracket 88 are in axial alignment with each other.

In order to pivotably interconnect canopy 14 to trailer 12, canopy 14 is positioned on trailer 12 such that upper edge 60 of sidewall 58 of side rail 46 is received within side rail receiving channel 100 of U-shaped bracket 88 extending along lower end 84a of side 84 of canopy 14 and such that upper edge 60 of sidewall 58 of side rail 48 is received within side rail receiving channel 100 of U-shaped bracket 88 extending along lower end 86a of side 86 of canopy 14. Forward apertures 102a and 102b in sidewalls 96 and 96, respectively, of each U-shaped bracket 88 are axially aligned with corresponding apertures 62 in sidewalls 58 of side rails 46 and 48. Similarly, the rearward apertures (not shown) in sidewalls 96 and 98, respectively, of each U-shaped bracket 88 are aligned with corresponding apertures 63 in sidewalls 58 of side rails 46 and 48.

In order to pivot canopy 14 on the forward end 36 of bed 34, shaft 74 of a first pin 76 is inserted through corresponding forward apertures 102a and 102b in sidewalls 96 and 98, respectively, of U-shaped bracket 88 mounted on side 84 of canopy 14 so as to pivotably interconnect side 84 of canopy 14 to side rail 46, and shaft 74 of a second pin 76 is inserted through corresponding forward apertures 102a and 102b in sidewalls 96 and 98, respectively, of U-shaped bracket 88 mounted on side 86 of canopy 14 so as to pivotably interconnect side 86 of canopy 14 and side rail 48. With pins 76 extending through U-shaped brackets 88, as heretofore described, heads 106 of pin 76 abut the corresponding outer surfaces 98a of sidewalls 98 of U-shaped brackets 88. It is contemplated to interconnect heads 106 of pins 76 to inwardly directed surfaces 108 and (not shown) of sides 84 and 86, respectively, of canopy 14 with chains 110 in order to prevent loss of pins 76.

In order to maintain pins 76 in position through corresponding U-shaped brackets 88, shafts 111 of locking pins 112 may be inserted through passageways 114 in shafts 74 of pins 76 so as to prevent shafts 74 of pins 76 from inadvertently sliding out of corresponding U-shaped brackets 88. It is contemplated to interconnect locking pins 112 to corresponding outer surfaces 116 and 117 of sidewalls 58 of side rails 46 and 48, respectively, by chains 118 so as to prevent the loss of locking pins 112.

Alternatively, in order to pivot canopy 14 on rearward end 38 of bed 34, shaft 74 of the first pin 76 is inserted through corresponding rearward apertures (not shown) in sidewalls 96 and 98, respectively, of U-shaped bracket 88 mounted on side 84 of canopy 14 so as to pivotably interconnect side 84 of canopy 14 to side rail 46. Shaft 74 of the second pin 76 is inserted through corresponding rearward apertures (not shown) in sidewalls 96 and 98, respectively, of U-shaped bracket 88 mounted on side 86 of canopy 14 so as to pivotably interconnect side 86 of canopy 14 with side rail 48.

With pin 76 extending through U-shaped brackets 88 as described, heads 106 of pins 76 abut corresponding outer surfaces 98a of side walls 98 of U-shaped brackets 88. In order to maintain pins 76 in position through corresponding rearward apertures (not shown) in U-shaped brackets 88, shafts 111 of locking pins 112 are inserted through passageways 114 in shafts 74 of pins 76 so as to prevent shafts 74 of pins 76 from inadvertently sliding out of corresponding U-shaped brackets 88. With pins 76 extending through U-shaped brackets 88 as described, heads 106 of pins 176 abut corresponding outer surfaces 98a of side walls 98 of U-shaped brackets 88.

Figure 4:
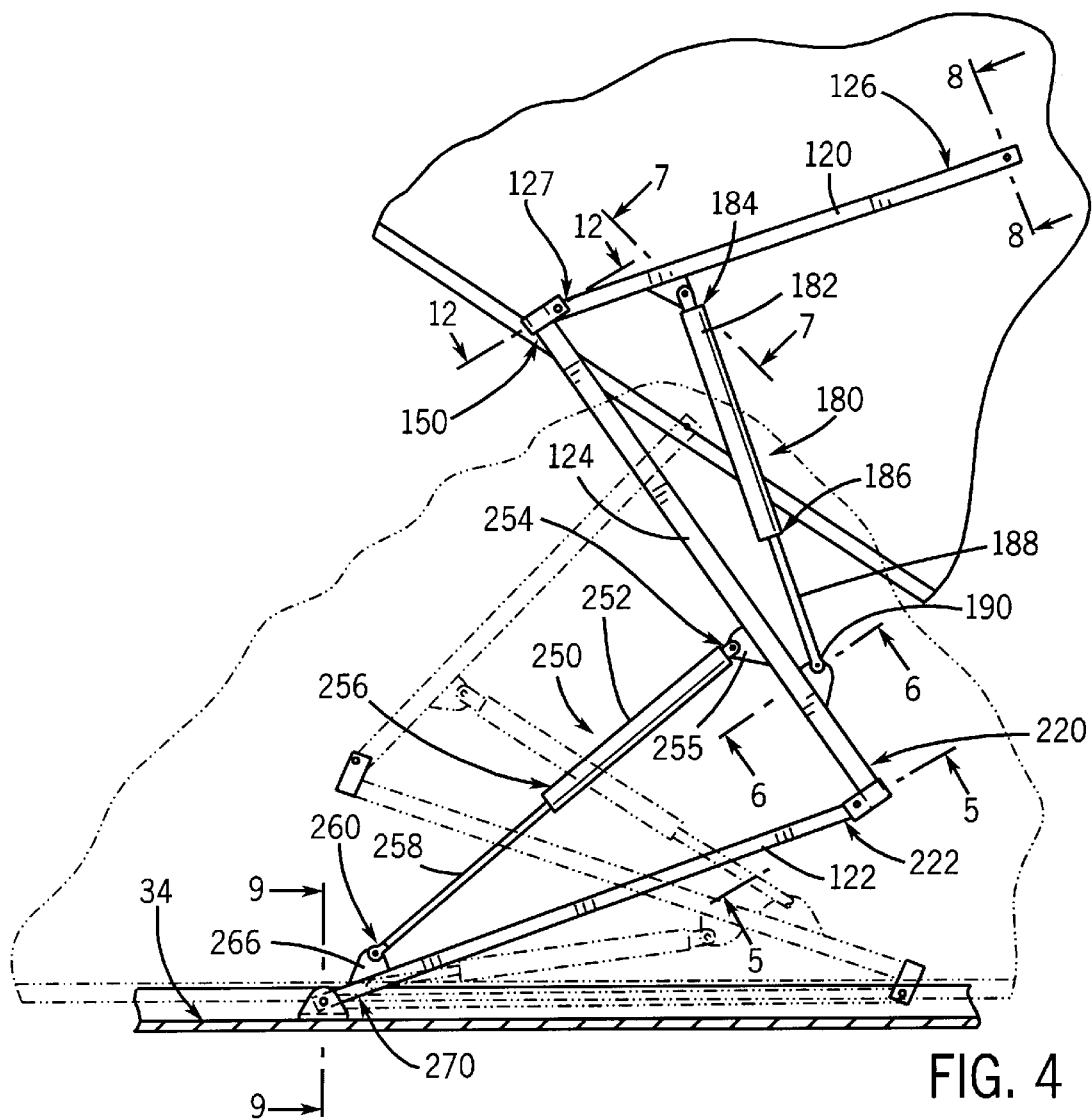
FIG. 4 is an enlarged view of FIG. 3a showing the support structure of the present invention with the canopy in an open position and showing the support structure, in phantom, with the canopy in the closed position.
Figure 8:
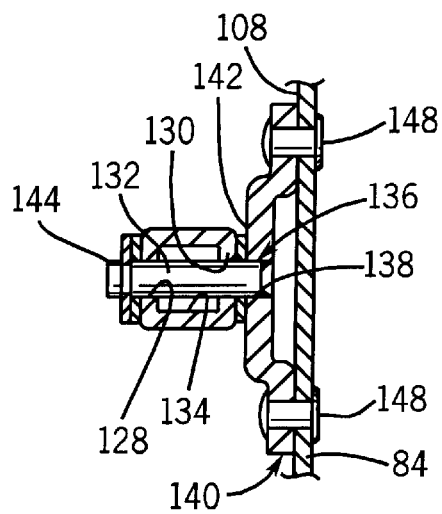
FIG. 8 is a cross-sectional view taken along line 8—8 of FIG. 4.

First and second support structures designated by the reference number 10, interconnect canopy 14 and trailer 12. Referring to FIG. 4, each support structure 10 includes an upper arm 120, a lower arm 122 and an intermediate arm 124 therebetween. Upper arm 120 is generally tubular and includes first and second opposite ends 126 and 127, respectively. As best seen in FIG. 8, the first end 126 of upper arm 120 includes first and second openings 128 and 130, respectively, therethrough in axial alignment with each other. Shaft 132 of pin 134 extends through openings 128 and 130 in first end 126 of upper arm 120 such that upper arm 120 is pivotable thereon. Terminal end 136 of shaft 132 is secured within an opening 138 in C-shaped bracket 140 such that first end 126 of upper arm 120 is captured on shaft 122 of pin 134 between inwardly directed surface 142 of C-shaped bracket 140 and head 144 of pin 134. In order to connect support structures 10 to canopy 14, C-shaped brackets 140 are secured to the inner surfaces 108 and (not shown) of sides 46 and 48, respectively, of canopy 14 by rivets 148.

Referring to FIG. 12, second end 127 of upper arm 120 of each support structure 10 is pivotably mounted to a first end 150 of corresponding intermediate arm 124. It is contemplated that a generally U-shaped bracket 152 be interconnected to outer surface 154 of intermediate arm 124 adjacent first end 150 thereof. U-shaped bracket 152 includes first and second legs 158 and 160, respectively, extending from opposite sides of a base 162. Legs 158 and 160 of U-shaped bracket 152 include apertures 164 and 166, respectively, therein which are in axial alignment with each other. Pin 170 extends through apertures 164 and 166 in legs 158 and 160 of U-shaped bracket 152 and through second end 127 of upper arm 120 so as to pivotably capture upper arm 120. Washers 172 and 173 are positioned on pin 170 between upper arm 120 and inner surfaces 174 and 176 of legs 158 and 160, respectively, of U-shaped bracket 152 in order to facilitate the pivoting of upper arm 120 with respect to intermediate arm 124.

Upper arm 120 and intermediate arm 124 of each support structure 10 are also interconnected by pneumatic springs 180. As is conventional, each pneumatic spring 180 includes a cylinder 182 having first and second opposite ends 184 and 186, respectively. Shaft 188 is slidably received within cylinder 182 and is moveable between a first retracted position, shown in phantom in FIG. 4, and a second extended position. Shaft 188 of each pneumatic spring 180 terminates at a terminal end 190.

Figure 7:
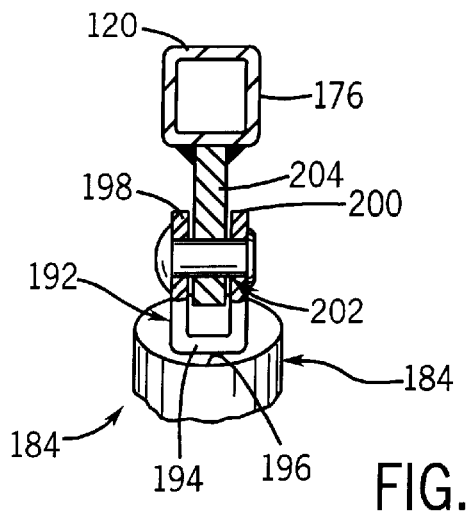
FIG. 7 is a cross-sectional view taken along line 7—7 of FIG. 4.

As best seen in FIG. 7, first end 184 of cylinder 182 has a generally U-shaped connection bracket 192 interconnected thereto. Connection bracket 192 includes a base 194 mounted to terminal surface 196 of cylinder 182. First and second legs 198 and 200 extend from opposite sides of base 194 of connection bracket 192. Pin 202 extends between legs 198 and 200 of connection bracket 192 to pivotably capture a connection flange 204 projecting from the outer surface 176 of upper arm 120. It is contemplated to affix connection flange 204 to the outer surface 176 of upper arm 120 in any suitable manner such as by welding or the like.

Figure 6:
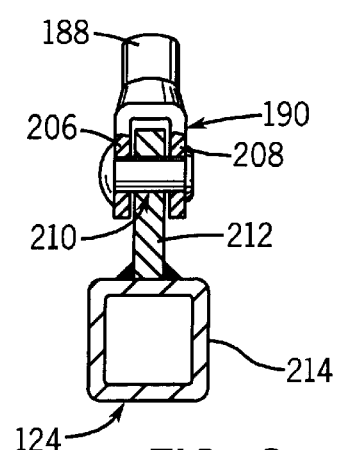
FIG. 6 is a cross-sectional view taken along line 6—6 of FIG. 4.

Referring to FIG. 6, terminal end 190 of shaft 188 of each pneumatic spring 180 includes first and second legs 206 and 208 projecting longitudinally therefrom. A pin 210 extends between legs 206 and 208 at terminal end 190 of shaft 188 to pivotably capture connection flange 212 which projects from the outer surface 214 of intermediate arm 124. It is contemplated that connection flange 212 be interconnected to the outer surface 214 of intermediate arm 124 in any suitable manner such as by welding or the like.

Figure 5:
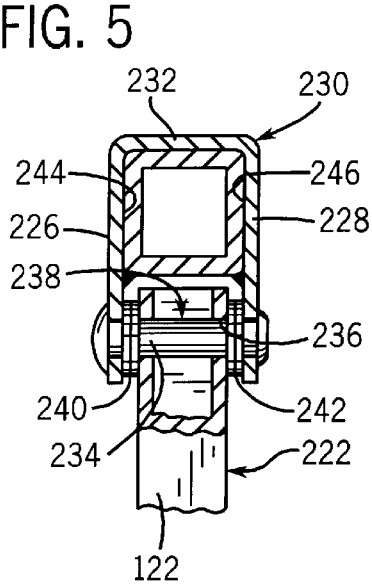
FIG. 5 is a cross-sectional view taken along line 5—5 of FIG. 4.

Referring to FIG. 5, second end 220 of intermediate arm 124 of each support structure 10 is pivotably mounted to first end 222 of lower arm 122 of each support structure 10. In the disclosed embodiment, second end 220 of intermediate arm 124 is inserted between legs 226 and 228 of generally U-shaped bracket 230 such that second end 220 of intermediate arm 124 abuts base 232 of U-shaped bracket 230. First and second legs 226 and 228, respectively, of U-shaped bracket 230 extend beyond second end 220 of intermediate arm 124 captured therebetween and include apertures 234 and 236, respectively, therein which are in axial alignment with each other. Pin 238 extends through apertures 234 and 236 in legs 226 and 228, respectively, of U-shaped bracket 230 and through first end 222 of lower arm 122 so as to capture lower arm 122 thereon. Washers 240 and 242 are positioned on pin 238 between lower arm 122 and inner surfaces 244 and 246 of legs 226 and 228, respectively, of U-shaped bracket 230 in order to facilitate the pivoting of lower arm 122 with respect to intermediate arm 124.

Lower arm 122 and intermediate arm 124 of each support structure 10 are also interconnected by pneumatic spring 250. As is conventional, each pneumatic spring 250 includes a cylinder 252 having first and second opposite ends 254 and 256, respectively. Shaft 258 is slideably received within cylinder 252 and is movable between a first retracted position, shown in phantom in FIG. 4, and a second extended position. Shaft 258 of each pneumatic spring 250 terminates at a terminal end 260.

It is contemplated that first end 254 of cylinder 252 be interconnected to flange 255 extending from intermediate arm 124 in the same manner as first end 184 of cylinder 182 is interconnected to flange 200 extending from first arm 120. Similarly, it is contemplated that terminal end 260 of shaft 258 of each pneumatic spring 250 be pivotably connected to corresponding connection flange 266 projecting from lower arm 122 in the same manner as terminal end 190 of shaft 188 of each pneumatic spring 180 is pivotably connected to corresponding connection flange 212 projecting from outer surface 214 of intermediate arm 122.

Figure 9:
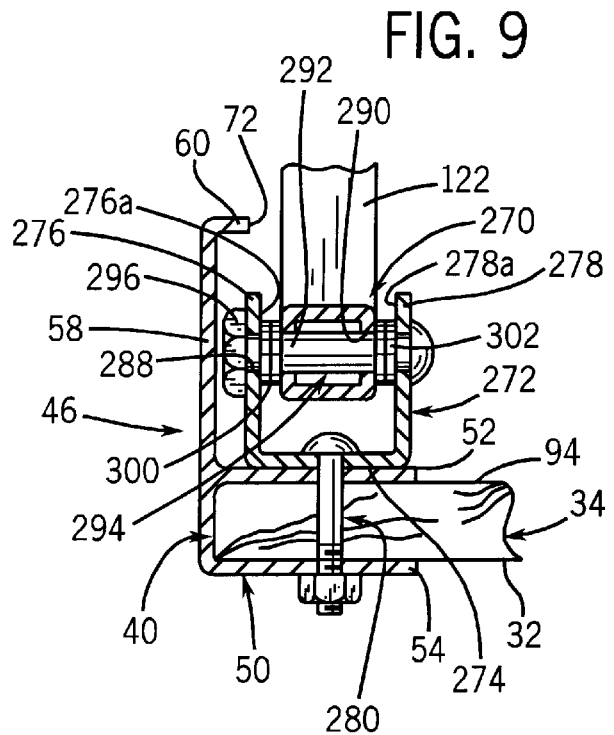
FIG. 9 is a cross-sectional view taken along line 9—9 of FIG. 4.

Referring to FIGS. 4 and 9, second end 270 of lower arm 122 of each support structure 10 is pivotably interconnected to bed 34 of trailer 12 adjacent corresponding side rails 46 and 48, respectively. To interconnect second ends 270 of lower arms 122 to bed 34, U-shaped brackets 272 are interconnected to C-shaped lower portions 50 of side rails 46 and 48 at a location centrally disposed between the forward and rearward ends 36 and 38, respectively, of bed 34. Each U-shaped bracket 272 includes a generally flat base 274 having first and second legs 276 and 278, respectively, projecting vertically from opposite sides thereof. Bolts 280 extends through bases 274 of U-shaped brackets 272 and upper and lower flanges 52 and 54, respectively, of corresponding side rails 46 and 48 such that each U-shaped bracket 272 abuts upper flange 52 of corresponding side rails 46 and 48.

Legs 276 and 278 of each U-shaped bracket 272 include apertures 288 and 290, respectively, therein. In order to interconnect each U-shaped bracket 272 to each support structure 10, shaft 292 of bolts 294 extends through apertures 288 and 290 in legs 276 and 278, respectively, and through second ends 270 of lower arms 122 so as to pivotably capture lower arms 122 thereon. Nuts 296 are threaded on shafts 292 of bolts 294 so as to capture legs 276 and 278 of U-shaped brackets 272 between nuts 296 and bolt heads 298. Washers 300 and 302 are positioned on shafts 292 between lower arms 122 and inner surfaces 276a and 278a of legs 276 and 278, respectively, of U-shaped brackets 272 in order to facilitate the pivoting of lower arms 122 on shafts 292 of bolts 294.

Figure 3A:
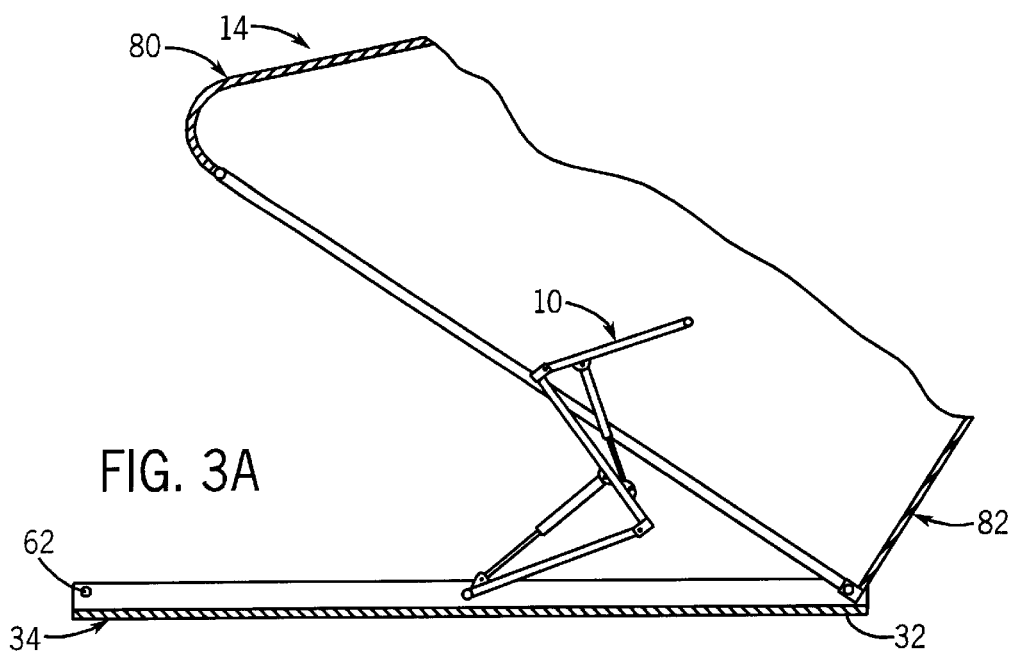
FIG. 3a is a cross-sectional view showing a portion of the trailer and the canopy of FIG. 1.

In operation, an operator interconnects canopy 14 to the desired end 36 or 38 of bed 34, as heretofore described. Depending on such connection, canopy 14 may be tilted toward the rearward end 38 of bed 34, FIGS. 1 and 3a, or toward the forward end 36 of bed 34, FIGS. 2 and 3c. In order to tilt canopy 14 toward the rearward end 38 of bed 34, pins 76 are removed from forward apertures 102a and 102b in U-shaped brackets 88 and from corresponding forward apertures 62 in side rails 46 and 48 and inserted through rearward apertures (not shown) in U-shaped brackets 88 and through corresponding rearward apertures 63 in side rails 46 and 48. The operator then lifts the forward end 80 of canopy 14 such that rearward end 82 of canopy 14 pivots on shafts 74 of pins 76. As the operator lifts canopy 14, pneumatic springs 180 and 250 of each support structure 10 extend in order to assist the operator. As the operator continues to lift canopy 14, pneumatic springs 180 and 250 of each support structure 10 provide sufficient force to maintain canopy 14 in the open position, FIGS. 1 and 3a.

Figure 3B:
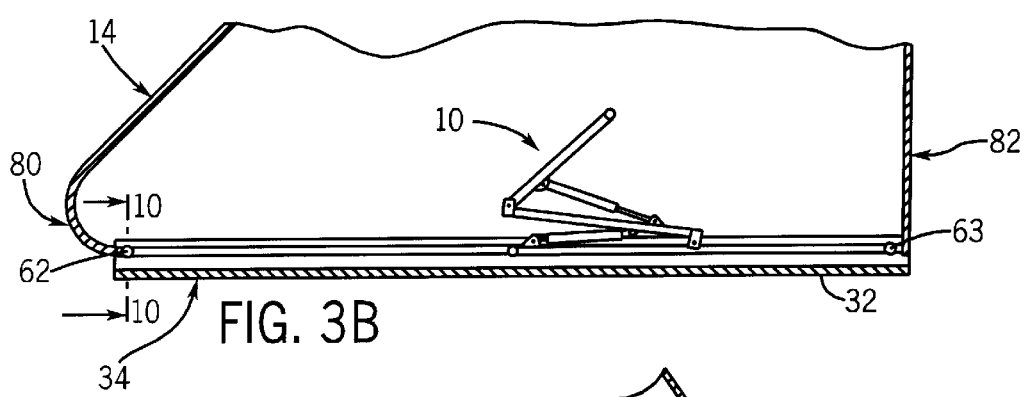
FIG. 3b is a cross-sectional view of the trailer and the canopy of FIG. 1 showing the canopy in a closed position.
Figure 3C:
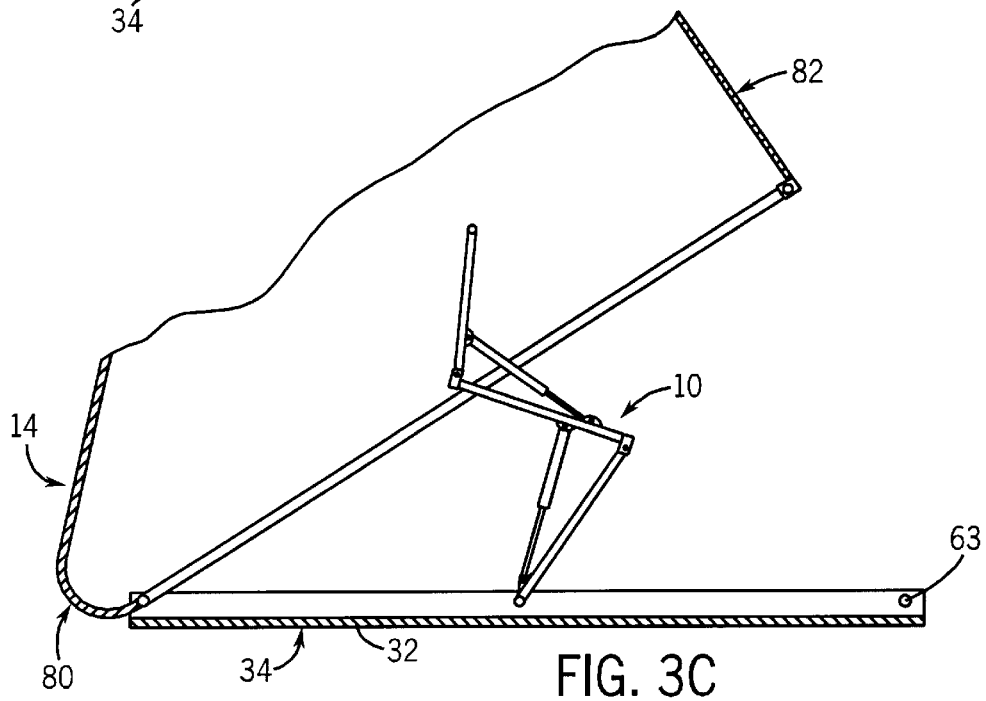
FIG. 3c is a cross-sectional view showing a portion of the trailer and the canopy of FIG. 2.

In order to tilt canopy toward the forward end 36 of bed, canopy 14 is returned to the closed position, FIG. 3b. Thereafter, pins 76 are removed from rearward apertures (not shown) in U-shaped brackets 88 and from corresponding rearward apertures 63 in side rails 46 and 48. Pins 76 are inserted through forward apertures 102a and 102b in U-shaped brackets 88 and through corresponding forward apertures 62 in side rails 46 and 48. The operator then lifts the rearward end 82 of canopy 14 such that forward end of canopy 14 pivots on shafts 74 of pins 76. As the operator lifts canopy 14, pneumatic springs 180 and 250 of each support structure 10 extend to assist the operator. As the operator continues to lift canopy 14, pneumatic springs 180 and 250 of each support structure 10 provides sufficient force to maintain canopy 14 in an open position, FIGS. 2 and 3c.

Various modes of carrying out the invention are contemplated as being within the scope of the following claims particularly pointing out and distinctly claiming the subject matter which is regarded as the invention.

What is claimed is:

1. A support structure for supporting a canopy on a trailer, comprising:
   a first support arm having first and second opposite ends, the first end pivotably connectable to the canopy;
   an intermediate support arm having first and second opposite ends, the first end of the intermediate support arm pivotably connected to the second end of the first support arm; and
   a third support arm having first and second opposite ends, the first end of the third support arm pivotably connected to the second end of the intermediate support arm and the second end of the third support arm pivotably connectable to the trailer.

2. The support structure of claim 1 further comprising a pneumatic spring interconnecting the first support arm and the intermediate support arm, the pneumatic spring urging the first end of the first support arm away from the intermediate support arm.

3. The support structure of claim 2 wherein the pneumatic spring includes a first and second opposite ends, the first end of the pneumatic spring pivotably connected to the first support arm and the second end of the pneumatic spring pivotably connected to the intermediate support arm.

4. The support structure of claim 2 further comprising a second pneumatic spring interconnecting the third support arm and the intermediate support arm, the second pneumatic spring urging the intermediate support arm away from second end of the third support arm.

5. The support structure of claim 4 wherein the second pneumatic spring includes a first and second opposite ends, the first end of the second pneumatic spring pivotably connected to the third support arm and the second end of the second pneumatic spring is pivotably connected to the intermediate support arm.

6. The support structure of claim 1 further comprising a pneumatic spring interconnecting the third support arm and the intermediate support arm.

7. The support structure of claim 6 wherein the pneumatic spring includes a first and second opposite ends, the first end of the pneumatic spring pivotably connected to the third support arm and the second end of the pneumatic spring is pivotably connected to the intermediate support arm.

8. support assembly for supporting a canopy on a trailer, comprising: first and second support structures, each support structure including:
   a first support arm having a first and second opposite ends, the first end pivotably connectable to the canopy;
   an intermediate support arm having first and second opposite ends, the first end of the intermediate support arm pivotably connected to the second end of the first support arm; and
   a third support arm having first and second opposite ends, the first end of the third support arm pivotably connected to the second end of the intermediate support arm and the second end of the third support arm pivotably connectable to the trailer.

9. The support assembly of claim 8 wherein each support structure includes a pneumatic spring, the pneumatic spring of each support structure interconnecting the first support arm and the intermediate support arm thereof.

10. The support assembly of claim 9 wherein each pneumatic spring has a first end pivotably connected to a corresponding first support arm and a second end pivotably connected to a corresponding intermediate support arm.

11. The support assembly of claim 9 wherein each support structure includes a second pneumatic spring, the second pneumatic spring of each support structure interconnecting the intermediate support arm and the third support arm thereof.

12. The support assembly of claim 11 wherein each second pneumatic spring has a first end pivotably connected to a corresponding intermediate support arm and a second end pivotably connected to a corresponding third support arm.

13. The support assembly of claim 8 wherein each support structure further includes a pneumatic spring interconnecting the third support arm and the intermediate support arm thereof.

14. The support structure of claim 13 wherein each pneumatic spring includes a first and second opposite ends, the first end of each pneumatic spring pivotably connected to a corresponding third support arm and the second end of each pneumatic spring pivotably connected to a corresponding intermediate support arm.

15. A trailer assembly for transporting a load, comprising:
   a frame structure extending along a longitudinal axis, the frame structure support above a supporting surface by a wheel and axle assembly;
   a bed mounted on the frame structure, the bed having forward and rearward ends and being defined first and second opposite sides;
   a canopy positioned on the bed, the canopy having forward and rearward ends; and
   a support structure interconnecting the canopy and the bed, the support structure including:
      a first support arm having a first and second opposite ends, the first end pivotably connected to the canopy;
      an intermediate support arm having first and second opposite ends, the first end of the intermediate support arm pivotably connected to the second end of the first support arm; and
      a third support arm having first and second opposite ends, the first end of the third support arm pivotably connected to the second end of the intermediate support arm and the second end of the third support arm pivotably connected to the bed.

16. The trailer assembly of claim 15 further comprising a first releasable hinge for pivotably connecting the canopy and the bed.

17. The trailer assembly of claim 16 further comprising a second releasable hinge for pivotably connecting the canopy and the bed wherein the first releasable hinge releasably interconnects the forward end of the canopy and the forward end of the bed and wherein the second releasable hinge releasably interconnects the rearward end of the canopy and the rearward end of the bed.

18. The trailer assembly of claim 15 wherein the canopy includes first and second opposite sides, each side terminating at an elongated, generally U-shaped bracket.

19. The trailer assembly of claim 18 further comprising first and second side rails extending along opposite sides of the bed, each side rail receivable within a corresponding U-shaped bracket.

20. The trailer assembly of claim 15 wherein the support structure includes a first pneumatic spring having a first end pivotably connected to the first support arm and a second end pivotably connected to the intermediate support arm, and a second pneumatic spring having a first end pivotably connected to the intermediate support arm and a second end pivotably connected to the third support arm.

* * * * *